United States Patent [19]
Shim

[11] Patent Number: 5,970,208
[45] Date of Patent: Oct. 19, 1999

[54] DEVICE FOR CONTROLLING MEMORY IN DIGITAL VIDEO DISK REPRODUCING DEVICE AND METHOD THEREFOR

[75] Inventor: Jae-Seong Shim, Seoul, Rep. of Korea

[73] Assignee: Samsung Electronics Co., Ltd., Suwon, Rep. of Korea

[21] Appl. No.: 08/879,031

[22] Filed: Jun. 19, 1997

[30] Foreign Application Priority Data

Jun. 21, 1996 [KR] Rep. of Korea ...................... 96-22968

[51] Int. Cl.⁶ ........................... H04N 5/781; H04N 5/85; H04N 5/90; H04N 5/91
[52] U.S. Cl. ........................... 386/126; 386/46; 348/716; 348/718; 369/60; 711/173
[58] Field of Search ................................... 386/1, 21, 33, 386/40, 45, 46, 116, 124, 125, 126; 348/714, 716, 718; 711/171, 172, 173; 369/32, 54, 60

[56] References Cited

U.S. PATENT DOCUMENTS

| | | | |
|---|---|---|---|
| 5,148,417 | 9/1992 | Wong et al. | 369/32 |
| 5,237,460 | 8/1993 | Miller et al. | 711/173 |
| 5,432,769 | 7/1995 | Honjo | 369/60 |

*Primary Examiner*—Wendy Garber
*Assistant Examiner*—Christopher Onuaku
*Attorney, Agent, or Firm*—Staas & Halsey

[57] ABSTRACT

A digital video disk reproducing device utilizes a single memory both for error correction and for data buffering. The device designates a unit number to each sector of the memory and determines first, second and third regions. The first region corresponds to an absolute value of a unit number obtained by subtracting a unit number Y of a sector where a data read/write operation is completed during the descrambling from a unit number X of a start sector in an error correction block where the error correction is completed. The second region corresponds to an absolute value of a unit number obtained by subtracting a unit number Z of a sector where the data is completely transferred to the audio/video decoders or the ROM decoder from the unit number Y. The third region corresponds to an absolute value of a unit number obtained by subtracting the unit number Z from a unit number W of a sector where a writing operation of demodulated data is completed. Thereafter, the devices controls a W-pointer and a Z-pointer not to overfill a Z-pointer and a Y-pointer respectively, and controls an X-pointer and the Y-pointer not to pass ahead of the W-pointer and the X-pointer, respectively.

10 Claims, 6 Drawing Sheets

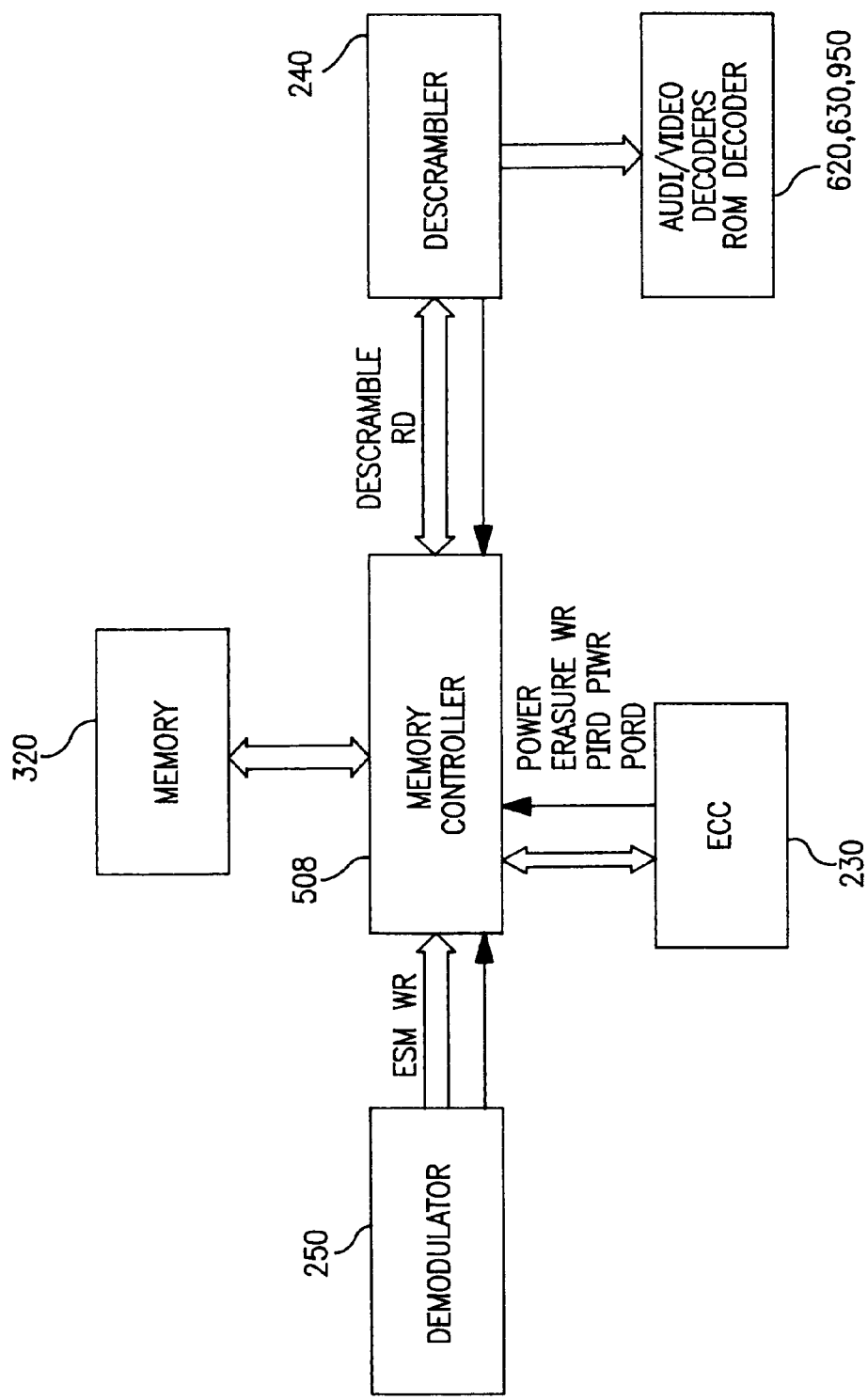

DEVICE FOR CONTROLLING MEMORY IN DIGITAL VIDEO DISK REPRODUCING DEVICE AND METHOD THEREFOR

BACKGROUND OF THE INVENTION

1. Field of the Invention

The present invention relates to a device and method for controlling a memory, and more particularly, a device and method for controlling a memory in a digital video (or versatile) disk reproducing device.

2. Description of the Related Art

A digital video disk, as a disk medium for a digital moving picture, is an inexpensive multimedia memory device capable of recording high quality video/audio data. Such a digital video disk can store over 2 hour's worth of an MPEG2 (Moving Picture Experts Group 2) digital image.

Referring to FIG. 1, there is illustrated a general digital video disk (DVD) reproducing device, in which a disk motor 160 rotates a disk 100 at a constant speed, and an optical pickup 140, with a head 120, reads a digital image on the disk 100 and converts the digital image into an analog high frequency (RF) signal. The converted analog signal compensates the feature of RF frequency input through a radio frequency equalizer RF EQ and is reshaped into a pulse, and a to generate ESM (Eight-to-Sixteen Demodulation) data of a data stream via an ESM slicer (not shown). The ESM data is applied to a digital phase locked loop (hereinafter, referred to as "PLL") 300 a system decoder 200 wherein the PLL 300 generates a first clock phase locked with a signal reproduces from the disk 100, thereby generating a clock PLCK capable of reading the ESM data in the system decoder 200. The digital PLL 300 includes a phase comparator, a voltage controlled oscillator and a frequency demultiplier, (all not shown) to generate the first clock phase locked with the signal reproduced from the disk 100 to generate the clock PLCK. A disk drive controller 400 controls a constant linear velocity of the disk revolution and other disk operations according to a frame synchronous signal Sf supplied from a synchronization detector (not shown) of the system decoder 200, in the light of a frequency servo and a phase servo. First and second memories 330 and 280 are a 128 Kb SRAM (Static Random Access Memory) and a 4 Mb RAM, respectively. The former is used for an error correction, while the latter is used for a VBR (Variable Bit Rate) buffer or a data buffer. The system decoder 200 demodulates the data read out from the disk 100 into the original state. The demodulated data is stored in the first memory 330 and read out by a block unit to correct errors at the system decoder 200. The error corrected data is stored again into the first memory 330. Further, the system decoder 200 descrambles the data read out from the first memory 330, to store the descrambled data into the second memory 280. The descrambled data is again read out from the second memory 280 and supplied to a demultiplexer 610 through the system decoder 200. The demultiplexer 610, as a data parser, provides an AC3/MPEG audio decoder 630 with an audio signal and an MPEG2 video decoder 620 with a video signal, respectively. A microcomputer 500 controls an overall operation of the optical disk reproducing system, and generates a transfer control signal in response to a data transfer start signal from the audio decoder 630 or the video decoder 620. The audio and video data demodulated respectively at the audio decoder 630 and the video decoder 620 are provided to a speaker 970 and a monitor 960 through a digital-to-analog converter 800 and an NTSC (or PAL) encoder 700, respectively. A ROM (Read Only Memory) decoder 950 is commonly prepared in a host computer (e.g., a personal computer) and operates according to a control of the host computer. The ROM decoder 950 transfers data generated from the system decoder 200 to the host computer based on a predetermined interfacing method.

Referring to FIG. 2, there is shown a detailed diagram of a section of the system decoder 200 related to controlling the first and second memories 330 and 280. Referring to FIGS. 3A and 3B, there are shown detailed diagrams of the first and second memories 330 and 280, respectively.

The first memory 330, as an error correction buffer, includes three regions ESM_wr, PI/PO_rd/wr, and Transfer, as shown in FIG. 3A. The region ESM_wr buffers 8–14 modulation data of the data stream ESM generated from the disk 100. The region PI/PO_rd/wr performs a PI/PO error correction with respect to an error correction block that has been buffered. The region Transfer is to transfer the error corrected data to the second memory 280. The second memory, as a VBR buffer, includes a region for buffering the error corrected data and another region for transferring data in accordance with a request from the audio and video decoders 620 and 630 or the ROM decoder 950, as shown in FIG. 3B. Further, a reference numeral (1) represents an absolute value obtained by subtracting an address for buffering the error corrected data into the memory from an address for transferring data to the audio and video decoders 620 and 630 or the ROM decoder 950. A reference numeral (2) represents an absolute value obtained by subtracting an address for transferring data to the audio and video decoders 620 and 630 or the ROM decoder 950 from an address for buffering the error corrected data into the memory. Referring to FIG. 3B, for example, suppose that the whole memory size is S, the domain of "data buffering" is B, and the domain "data transferring" is T. If B<T, (1)=S−(T−B) and (2)=T−B. However, if B>T,(1)=B−T and (2)=S−(B−T).

The system decoder 200 includes a demodulator 250, an ECC (Error Correction Circuit) 230, an ECC memory controller 503, a VBR memory controller 506, and a descrambler 240. The demodulator 250 demodulates the input data stream ESM by the symbol unit of predetermined bit numbers. On the other words, the demodulator 250 applies the data stream ESM to a 32-bit shift register (not shown). Lower (or upper) 16 bits out of the 32-bit output from the 32-bit shift register are transferred to a 16-8 demodulator (not shown). The 32-bit shift register and the 16-8 demodulator are typically provided in the demodulator 250. The 16-8 demodulator converts the 16-bit data input into 8-bit data which constitutes the symbol. This operation should be performed, since the data has undergone the 8-16 modulation when being written on the disk 100.

The ECC (Error Correction Circuit) memory controller 503 controls an access to the first memory 330, in order to correct an error with respect to the demodulated data. The ECC 230 corrects an error in the row and column directions with respect to a predetermined error correction block including the data read from disks in a DVD (Digital Video Disk) system. It should be noted that in the application, the data are of (182, 172, 11) in row and (208, 192, 17) in column, respectively. Namely, lengths of the codeword are respectively 182 in row and 208 in column, lengths of main data excluding parity are respectively 172 in row and 192 in column, and intervals between the codewords are respectively 11 in row and 17 in column. In order to perform such error correction, the first memory 330 receives ID (Identification) data and main data generated from the demodulator 250 and stores those data by the block unit, so as to form the error correction block. The error correction block includes data for 16 sectors. Further, the first memory 330 also buffers the data while the error corrections are executed in the row and column directions, and stores the error corrected data.

A VBR memory controller 506 controls an access to the second memory 280 in order to VBR-buffer the error corrected data. Namely, the VBR memory controller 506 allows the second memory 280 to buffer the descrambled DVD data and transfers the buffered data to the audio and video decoders 620 and 630 according to the data transfer control signal generated from the microcomputer 500.

A descrambler 240 reads and descrambles the main data which has been scrambled prior to being written on the disk 100, to restore to the original data. The main data is 2 Kbyte in size.

A system clock generator 900 generates a clock signal used by the disk drive controller 400.

As can be appreciated from the above descriptions, the prior art DVD reproducing device includes the error correction memory and the VBR or data buffering memory separately. Accordingly, the memory controllers should be prepared separately, so that the structure may become complicated and the manufacturing cost may increase. As the result, it may be difficult to make the products compact.

SUMMARY OF THE INVENTION

It is therefore an object of the present invention to provide a compact digital video disk reproducing device including a single memory used both for an error correction and for a data buffering, and a method for controlling the same.

According to an aspect of the present invention, a method for controlling a memory in an optical disk reproducing device, wherein the memory is accessed to read or write data while performing a modulation, an error correction, a deinterleaving, a descrambling and a transferring of the data to audio/video decoders or a ROM decoder with respect to the data read from an optical disk, includes the steps of: designating a unit number to each sector of the memory; determining first, second and third regions, the first region corresponding to an absolute value of a unit number obtained by subtracting a unit number Y of a sector where a data read/write operation is completed during the descrambling from a unit number X of a start sector in an error correction block where the error correction is completed, the second region corresponding to an absolute value of a unit number obtained by subtracting a unit number Z of a sector where the data is completely transferred to the audio/video decoders or the ROM decoder from the unit number Y, and the third region corresponding to an absolute value of a unit number obtained by subtracting the unit number Z from a unit number W of a sector where a writing operation of demodulated data is completed; and controlling a W-pointer and a Z-pointer not to overflow (or pass ahead of) a Z-pointer and a Y-pointer respectively, and controlling an X-pointer and the Y-pointer not to pass ahead of the W-pointer and the X-pointer, respectively.

According to another aspect of the present invention, a method for controlling a memory in an optical disk reproducing device, wherein the memory is accessed to read or write data while performing a modulation, an error correction, a deinterleaving, a descrambling and a transferring of the data to audio/video decoders or a ROM decoder with respect to the data read from an optical disk, includes the steps of: designating a unit number to each sector of the memory; determining first and second regions, the first region corresponding to an absolute value of a unit number obtained by subtracting a unit number Z of a sector where the descrambling and the data transferring to the audio/video decoders or the ROM decoder are completed from a unit number X of a start sector in an error correction block where the error correction is completed, the second region corresponding to an absolute value of a unit number obtained by subtracting the unit number Z from a unit number W of a sector where demodulated data is completely written into a buffer; and controlling a W-pointer and a Z-pointer not to overfill a Z-pointer and a Y-pointer respectively, and controlling an X-pointer not to pass ahead of the W-pointer.

BRIEF DESCRIPTION OF THE DRAWINGS

The above and other objects, features and advantages of the present invention will become more apparent in light of the following detailed description of exemplary embodiments thereof taken with the attached drawings, in which:

FIG. 7 is a detailed diagram of a section of a system decoder related to controlling a memory shown in FIG. 4 according to a second aspect of the present invention.

DETAILED DESCRIPTION OF THE PREFERRED EMBODIMENT(S)

Figure 1:
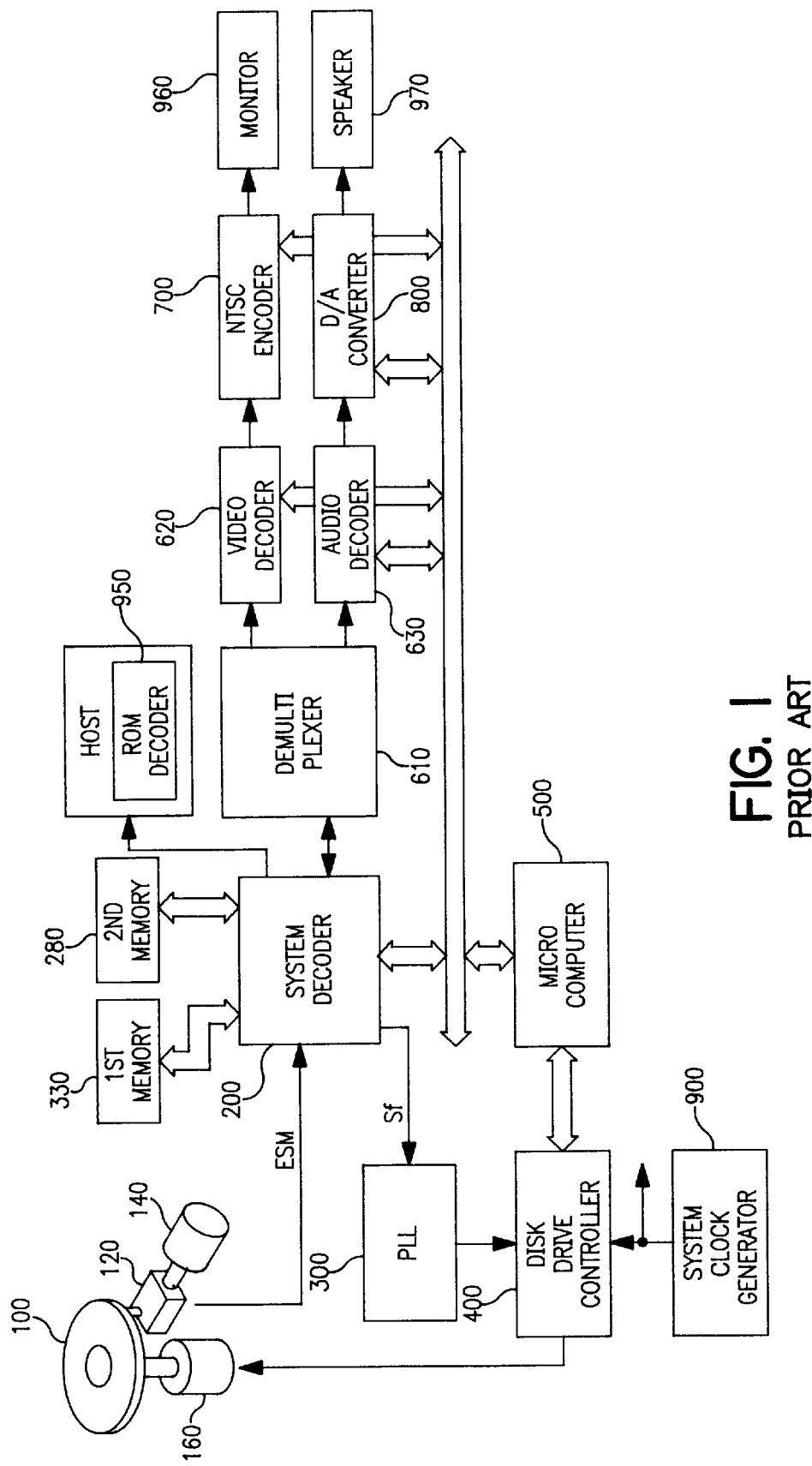
FIG. 1 is a schematic block diagram of a digital video disk reproducing device according to the prior art.
Figure 2:
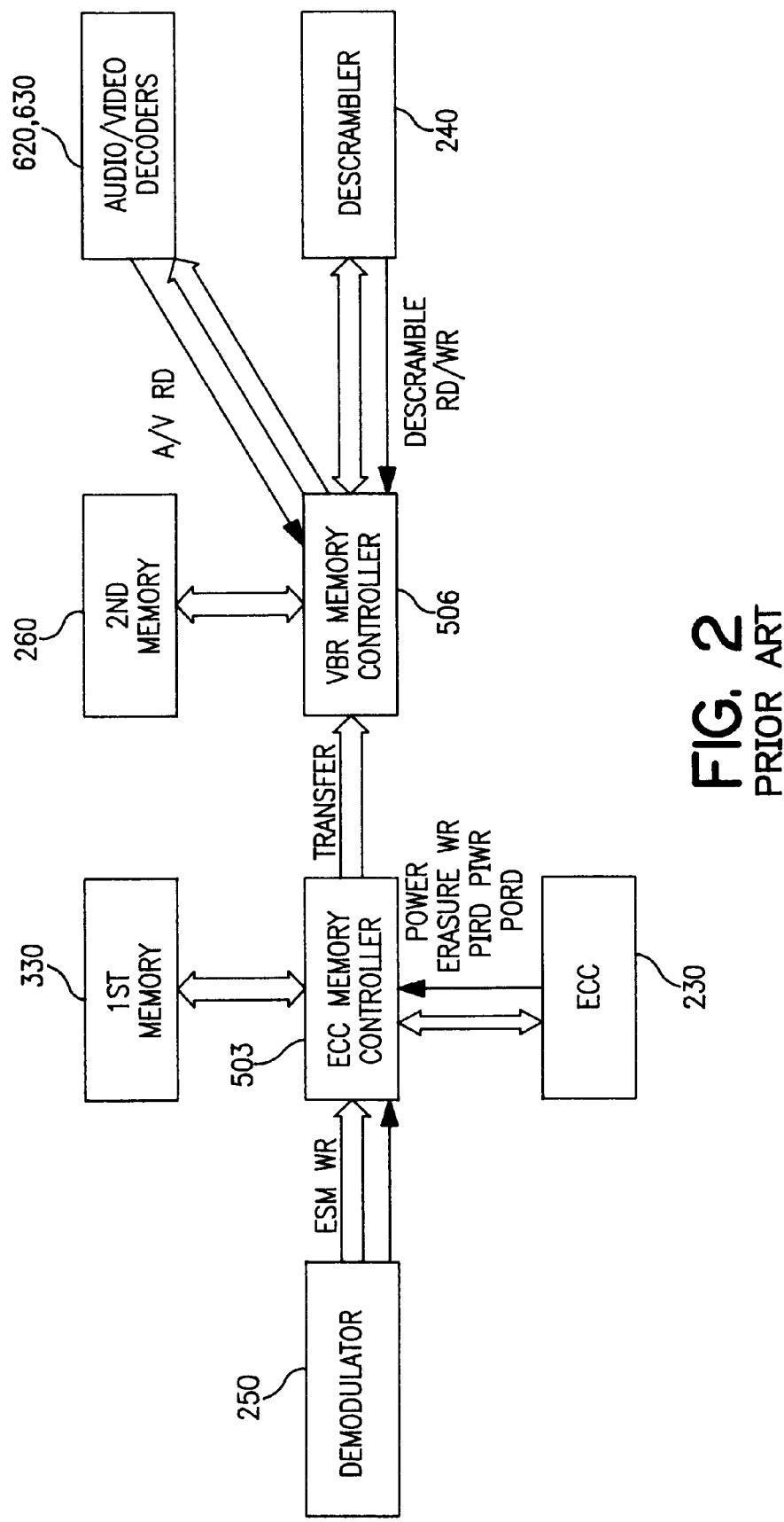
FIG. 2 is a detailed diagram of a section of a system decoder shown in FIG. 1 related to controlling memories shown in FIG. 1.
Figure 3A:
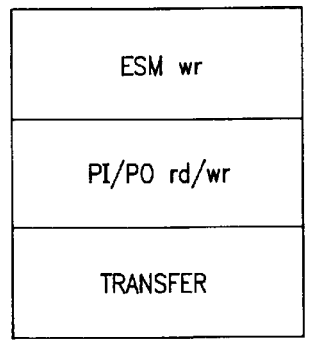
FIGS. 3A and 3B are diagrams showing first and second memories shown in FIG. 1, respectively.
Figure 3B:
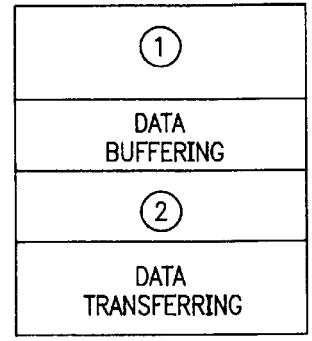

Preferred embodiments of the present invention will be described in detail hereinbelow with reference to the attached drawings, in which like reference numerals represent like elements. Further, it should be clearly understood by those skilled in the art that many specifics, such as the detailed circuit elements, are shown only by way of an example to bring a better understanding of the present invention and the present invention may be embodied without those specifics. Moreover, it should be noted that detailed descriptions on the related prior art may be intentionally omitted if it is believed to be unnecessary in describing the concepts of the present invention.

Figure 4:
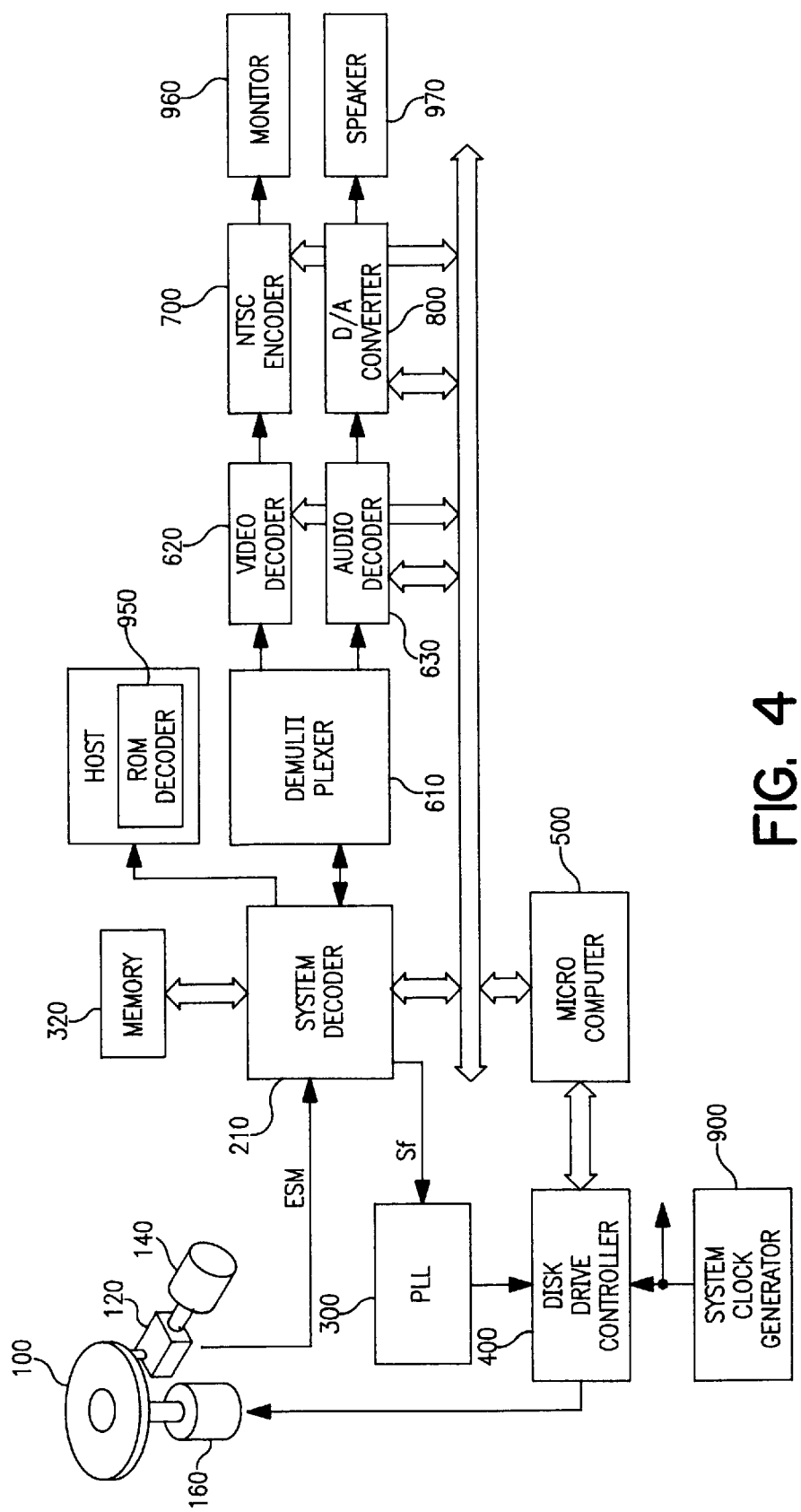
FIG. 4 is a schematic block diagram of a digital video disk reproducing device according to an embodiment of the present invention.

Referring to FIG. 4, there is illustrated a digital video disk reproducing device according to an embodiment of the present invention. It is shown in the drawing that the digital video disk reproducing device includes a single memory 320 and other structures are the same as those of the prior art device shown in FIG. 1, with the exception of the system decoder 210. Namely, the memory 320 performs the error correction as well as the VBR or data buffering.

Figure 5:
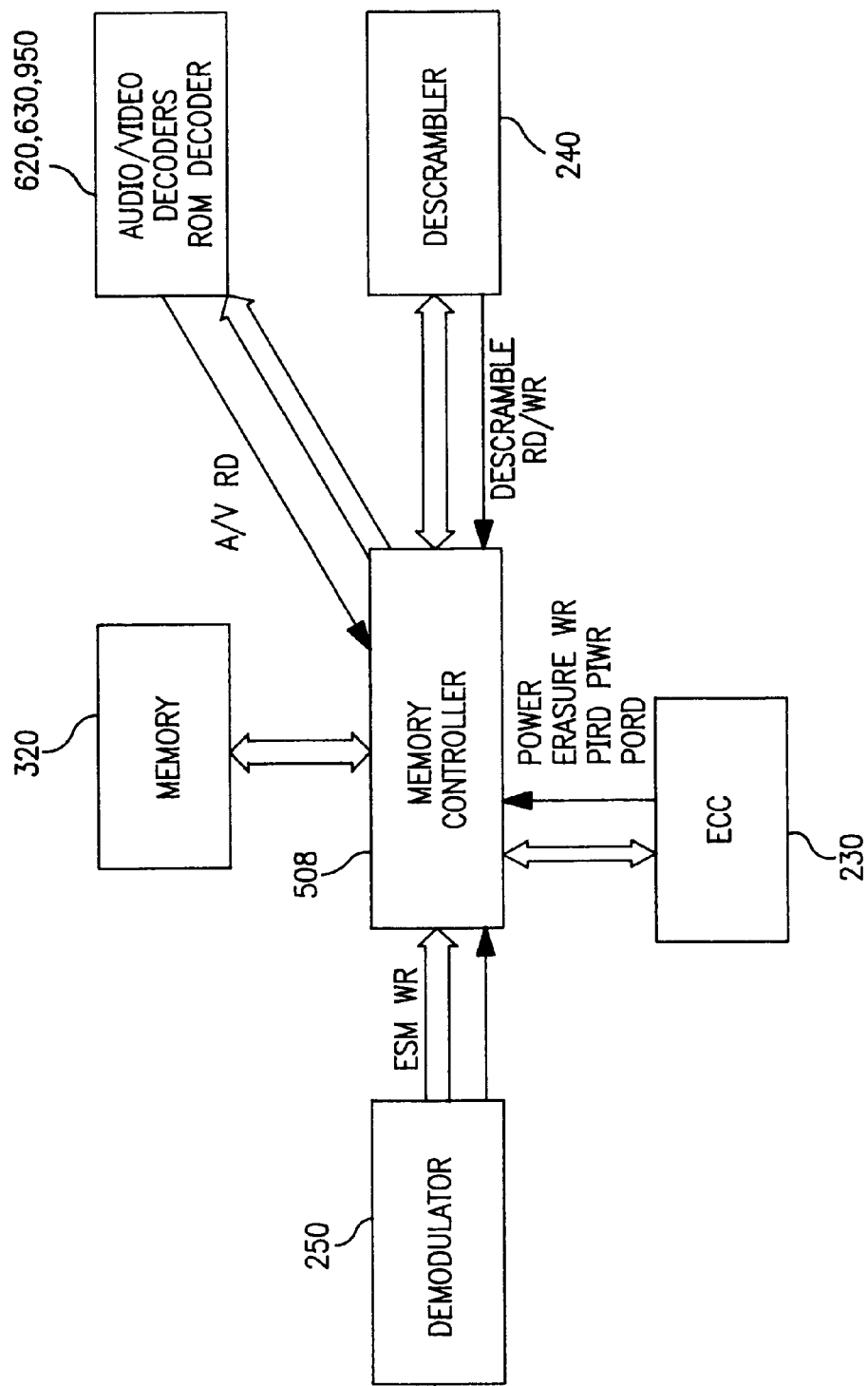
FIG. 5 is a detailed diagram of a section of a system decoder related to controlling a memory shown in FIG. 4 according to a first aspect of the present invention.

Referring to FIG. 5, there is shown a detailed diagram of a section of the system decoder 210 related to controlling the memory 320 shown in FIG. 4 according to a first aspect of the present invention. The memory 320 is used both for the error correction and for the VBR or data buffering. The system decoder 210 includes a demodulator 250, a memory controller 508, an ECC 230, and a descrambler 240. The demodulator 250 demodulates the input data stream ESM by the symbol unit of predetermined bit numbers. On the other words, the demodulator 250 applies the data stream ESM to a 32-bit shift register (not shown). Lower (or upper) 16 bits out of the 32-bit data output from the 32-bit shift register 211 are transferred to a 16-8 demodulator (not shown). The 16-8 demodulator converts the 16-bit data input into 8-bit data which constitutes the symbol. This operation should be performed, since the data has undergone the 8-16 modulation when being written on the disk 100.

The ECC 230 corrects an error in row and column directions with respect to a predetermined error correction block including the data read from disks in the DVD (Digital Video Disk) system. It should be noted that in the application, the data are (182, 172, 11) in row and (208, 192, 17) in column, respectively. Namely, lengths of the codeword are respectively 182 in row and 208 in column, lengths of main data excluding parity are respectively 172 in row and 192 in column, and intervals between the codewords are respectively 11 in row and 17 in column. In order to perform such error correction, the memory 320 receives ID data and main data generated from the demodulator 250 and stores those data by the block unit, so as to form the error correction block. The error correction block includes data for 16 sectors. Further, the memory 320 also buffers the data while the error corrections are executed in the row and column directions, and stores the error corrected data. In order to perform PI error correction, the ECC 230 issues a PIRD to read the appropriate data from memory. Similarly, in order to perform PO error correction, the ECC 230 issues a PORD command to read data from a memory. Once the PI error correction is performed, the ECC 230 issues a PIWR command to write data to the memory. After PO error correction has been performed, the ECC 230 issues a POWR command to write data to the memory. Initially, the ECC 230 issues an ERASURE WR so as to write data to the memory after an ERASURE error correction.

A descrambler 240 reads the main data which has been scrambled prior to being written on the disk by generating the Descramble_RD signal. Similarly, the descrambler 240 writes the main data by issuing a descramble_WR signal. The descrambler 240 descrambles the main data to restore to the original data. The main data is 2Kbyte in size.

A memory controller 508 controls an access to the memory 320, in order to correct an error with respect to the demodulated data. Furthermore, the memory controller 508 controls an access to the memory 320, so as to descramble the error corrected data. Namely, the memory controller 508 reads data to be descrambled from the memory 320 and/or allows the memory 320 to buffer the descrambled data and transfer the buffered data to the audio and video decoders 620 and 630 or the ROM decoder 950 according to the data transfer control signal generated from the microcomputer 500. The audio and video decoders 620 and 630 or the ROM decoder 950 generate a transfer request signal A/V_RD, so as to cause the microcomputer 500 to generate the transfer control signal to the memory controller 508.

Figure 6:
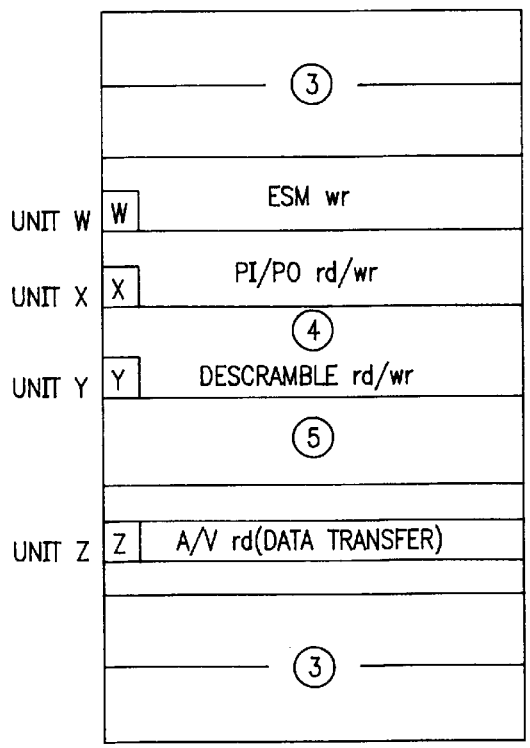
FIG. 6 is a diagram for explaining how a memory buffer is managed while a memory controller shown in FIG. 5 processes various request signals.

Referring to FIG. 6, there is shown a diagram for explaining how a memory buffer is managed while the memory controller 508 shown in FIG. 5 processes various request signals. In the drawing, a letter "W" represents a unit number of a sector where the 8-16 demodulated data has been stored into the buffer; a letter "X" a unit number of a sector where the error correction has been completed; a letter "Y" a unit number of a sector where the descrambling has been completed; a letter "Z" a unit number of a sector where the data is completely transferred to the audio and video decoders 620 and 630 or the ROM decoder 950.

Meanwhile, a reference numeral (4) represents a region corresponding to an absolute value of the unit number obtained by subtracting the unit number "Y" of the sector where the descrambler 240 has completed the data read/write operation, from the unit number "X" of a start sector of an error corrected block where the error correction has been completed. A reference numeral (5) represents a region corresponding to an absolute value of the unit number obtained by subtracting the unit number "Z" of the sector where the data has been completely transferred to the audio and video decoders 620 and 630 or the ROM decoder 950, from the unit number "Y" of the sector where the descrambler 240 has completed the data read/write operation. Further, a reference numeral (3) represents a region corresponding to an absolute value of the unit number obtained by subtracting the unit number "Z" of the sector where the data has been completely transferred to the audio and video decoders 620 and 630 or the ROM decoder 950, from the unit number "W" of the sector where the demodulated data has been completely stored into the buffer. For example, suppose that the whole memory size is S. If Z>W, (3)=S−(Z−W). Conversely, if Z <W, (3)=W−Z.

Here, the buffer is managed such that a W-pointer should not overflow (or pass ahead of) a Z-pointer (memory overfull state) and the Z-pointer should not overflow a Y-pointer (memory empty state). In order to secure such buffer management, the system decoder 200 notifies buffer states, such as a memory overfull state and a memory underfull state, to the microcomputer 500. Further, the system decoder 200 automatically controls the X-pointer and the Y-pointer not to pass ahead of the W-pointer and the X-pointer, respectively. Here, a standard unit of the unit numbers is assumed to be 2Kbyte which is a standard unit for the memory management.

Referring to FIG. 7, there is shown a detailed diagram of a section of a decoder 210 related to controlling the memory 320 shown in FIG. 4 according to a second aspect of the present invention. When compared with the first aspect shown in FIG. 5, the second aspect is different only in that the descrambler 240 and the audio/video decoders 620 and 630 or the ROM decoder 950 do not generate the request signals described in the foregoing to the memory controller 508.

As illustrated in FIG. 7, the audio/video decoders 620 and 630 or the ROM decoder 950 receive the descrambled data directly from the descrambler 240. Thus, it is not necessary that the audio/video decoders 620 and 630 or the ROM decoder 950 generate the transfer request signal A/V_RD to the memory controller 508. Accordingly, the descrambler 240 does not need to generate the write request signal (Descramble_WR) to the memory controller 508.

Figure 8:
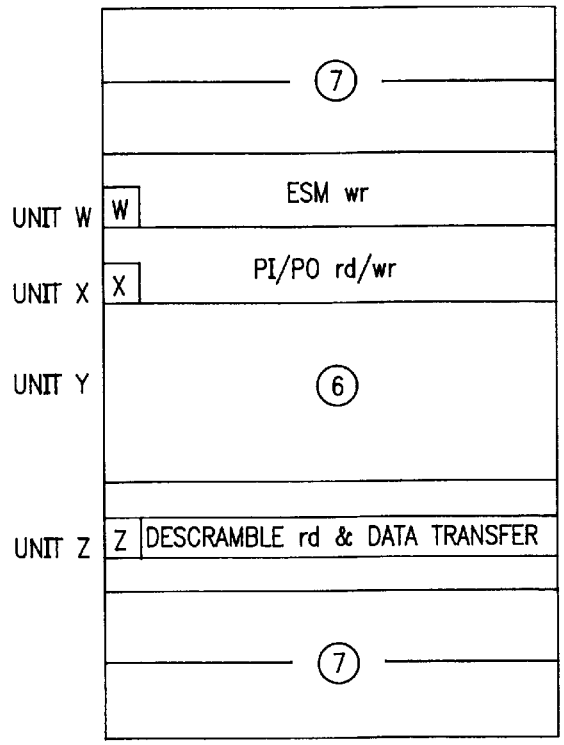
FIG. 8 is a diagram for explaining how a memory buffer is managed while a memory controller shown in FIG. 7 processes various request signals.

Referring to FIG. 8, there is shown a diagram for explaining how a memory buffer is managed while the memory controller 508 shown in FIG. 7 processes various request signals. In the drawing, a reference numeral (6) represents a region corresponding to an absolute value of a unit number obtained by subtracting the unit number "Z" of the sector where the descrambling and the data transferring are completed, from the unit number "X" of a start sector in an error correction block where the error correction is completed. A reference numeral (7) represents a region corresponding to an absolute value of a unit number obtained by subtracting the unit number "Z" of the sector where the descrambling and the data transferring are completed, from the unit number "W" of the sector where the demodulated data is completely written into the buffer.

Here, the buffer is managed such that the W-pointer should not overflow (or pass ahead of) the Z-pointer (memory overfull state) and the Z-pointer should not overfill the Y-pointer (memory empty state). In order to secure such buffer management, the system decoder 200 notifies buffer states, such as a memory overfull state and a memory underfull state, to the microcomputer 500. Further, the system decoder 200 automatically controls the X-pointer not to pass ahead of the W-pointer.

As described above, the digital video disk reproducing device according to the present invention includes a single memory used both for the error correction and for the data buffering, so that the manufacturing cost may be reduced and the circuit structure may be simplified.

Although various preferred embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for controlling a memory in an optical disk reproducing device, wherein the memory is accessed to read or write data on which a modulation, an error correction, a deinterleaving, a descrambling and a transferring of the data to audio/video decoders or a ROM decoder with respect to the data read from an optical disk are performed, comprising the steps of:

designating a unit number to each sector of the memory;

determining first, second and third regions of the memory, said first region corresponding to an absolute value of a first unit number obtained by subtracting a unit number Y of a first sector where a data read/write operation is completed during the descrambling from a unit number X of a start sector in an error correction block where the error correction is completed, said second region corresponding to an absolute value of a second unit number obtained by subtracting a unit number Z of a second sector where the data is completely transferred to the audio/video decoders or the ROM decoder from said unit number Y, said third region corresponding to an absolute value of a third unit number obtained by subtracting said unit number Z from a unit number W of a third sector where a writing operation of demodulated data is completed; and controlling a W-pointer and a Z-pointer not to overfill a Z-pointer and a Y-pointer, respectively, and controlling an X-pointer and the Y-pointer not to pass ahead of the W-pointer and the X-pointer, respectively.

2. A method for controlling a memory as claimed in claim 1, further comprising the steps of:

transmitting a transfer request signal from the audio/video decoders or the ROM decoder to a processing device;

transmitting a transfer control signal from said processing device to a memory controller in response to the transfer request signal; and transferring the descrambled data stored in the memory to the audio/video decoders or the ROM decoder through control of the memory controller, in response to the transfer control signal.

3. A method for controlling a memory in an optical disk reproducing device, wherein the memory is accessed to read or write data while performing a modulation, an error correction, a deinterleaving, a descrambling and a transferring of the data to audio/video decoders or a ROM decoder with respect to the data read from an optical disk, comprising the steps of:

designating a unit number to each sector of the memory;

determining first and second regions of the memory, said first region corresponding to an absolute value of a first unit number obtained by subtracting a unit number Z of a first sector where the descrambling and the data transferring to the audio/video decoders or the ROM decoder are completed from a unit number X of a start sector in an error correction block where the error correction is completed, said second region corresponding to an absolute value of a second unit number obtained by subtracting said unit number Z from a unit number W of a second sector where demodulated data is completely written into a buffer of the memory; and controlling a W-pointer and a Z-pointer not to overfill a Z-pointer and a Y-pointer, respectively, and controlling an X-pointer not to pass ahead of the W-pointer.

4. A method for controlling a memory as claimed in claim 3, further comprising the steps of:

transmitting a request signal from a descrambler to a memory controller to transmit the error correction block which has already been corrected to the descrambler for descrambling; and automatically transferring the descrambled data from the memory through the descrambler to the audio/video decoders or the ROM decoder.

5. A device for controlling a memory, comprising:

a demodulator to demodulate data as demodulated data;

a memory controller to control access to said memory, including storing said demodulated data in said memory in error correction blocks;

an error correction circuit to correct errors in said error correction blocks, wherein said memory controller stores corrected blocks in said memory;

a descrambler to receive the corrected blocks from said memory according to control by said memory controller, wherein said memory controller stores said descrambled data in said memory; and a decoder to decode said descrambled data read out of said memory by said memory controller;

wherein said memory controller designates a unit number to each sector of said memory, determines a first region of said memory corresponding to a first absolute value of a first difference between a first one of the unit numbers of a first one of the sectors wherein a data read/write is completed of said descrambled data and a second one of the unit numbers of a second one of the sectors which is a start sector of one of the corrected blocks is stored, a second region corresponding to a second absolute value of a second difference between a third unit number of a third one of the sectors wherein the descrambled data is completely transferred to said decoder and said first unit number, and a third region corresponding to a third absolute value between said third unit number and a fourth one of the unit numbers of a fourth one of the sectors wherein a writing operation of the demodulated data is completed, said memory controller controlling a first pointer which points to said fourth unit number and a second pointer which points to said third unit number not to overfill said second pointer and a third pointer which points to said first unit number, respectively, and controlling a fourth pointer which points to said second unit number and said first pointer not to pass ahead of said first and fourth pointers, respectively.

6. The device as claimed in claim 5, wherein said error correction circuit corrects errors in row and column directions of each error correction block.

7. The device as claimed in claim 5, further comprising a processing device, wherein said decoder transmits a transfer request signal to said processing device, said processing device transmits a transfer control signal to said memory controller in response to said transfer request signal, and said memory controller transfers said descrambled data stored in said memory to said decoder, in response to said transfer control signal.

8. A device for controlling a memory, comprising:
   a demodulator to demodulate data as demodulated data;
   a memory controller to control access to said memory, including storing said demodulated data in said memory in error correction blocks;
   an error correction circuit to correct errors in said error correction blocks, wherein said memory controller stores corrected blocks in said memory;
   a descrambler to receive the corrected blocks from said memory according to control by said memory controller, wherein said memory controller stores said descrambled data in said memory; and
   a decoder to automatically decode said descrambled data from said descrambler;
   wherein said memory controller designates a unit number to each sector of said memory, determines a first region of said memory corresponding to a first absolute value of a first difference between a first one of the unit numbers of a first one of the sectors wherein said descrambled data is stored for transfer to said decoder and a second one of the unit numbers of a second one of the sectors which is a start sector of one of the corrected blocks is stored, and a second region corresponding to a second absolute value of a second difference between said first unit number and a third unit number of a third one of the sectors wherein said demodulated data is completely written in said memory, said memory controller controlling a first pointer which points to said third unit number and a second pointer which points to said first unit number not to overfill said second pointer and a third pointer, respectively, and controlling a fourth pointer which points to said second unit number not to pass ahead of said first pointer.

9. The device as claimed in claim 8, wherein said error correction circuit corrects errors in row and column directions of each error correction block.

10. The device for controlling a memory as claimed in claim 8, wherein:
   said descrambler transmits a request signal to said memory controller to transmit said error correction block which has already been corrected to said descrambler for descrambling; and
   automatically transferring said descrambled data from the memory through said descrambler to said decoder.

* * * * *